(12) United States Patent
Leister et al.

(10) Patent No.: US 8,687,252 B2
(45) Date of Patent: Apr. 1, 2014

(54) DEVICE FOR LIGHT MODULATION

(75) Inventors: Norbert Leister, Dresden (DE); Ralf Haussler, Dresden (DE); Steffen Buschbeck, Jena (DE)

(73) Assignee: Seereal Technologies S.A., Munsbach (LU)

( * ) Notice: Subject to any disclaimer, the term of this patent is extended or adjusted under 35 U.S.C. 154(b) by 741 days.

(21) Appl. No.: 12/663,649

(22) PCT Filed: Jun. 5, 2008

(86) PCT No.: PCT/EP2008/057000
§ 371 (c)(1),
(2), (4) Date: Apr. 12, 2010

(87) PCT Pub. No.: WO2008/151980
PCT Pub. Date: Dec. 18, 2008

(65) Prior Publication Data
US 2010/0195178 A1    Aug. 5, 2010

(30) Foreign Application Priority Data

Jun. 13, 2007  (DE) .......................... 10 2007 028 371

(51) Int. Cl.
G03H 1/12    (2006.01)

(52) U.S. Cl.
USPC .......................................................... 359/11

(58) Field of Classification Search
USPC .................. 359/1–35, 237–304, 315–324
See application file for complete search history.

(56) References Cited

U.S. PATENT DOCUMENTS

| | | | |
|---|---|---|---|
| 5,416,618 A | 5/1995 | Juday | |
| 5,719,650 A | 2/1998 | Wefers et al. | |
| 6,055,086 A * | 4/2000 | Soutar et al. | 359/246 |
| 2005/0134948 A1* | 6/2005 | Waldman et al. | 359/3 |
| 2006/0215079 A1* | 9/2006 | Suzuki et al. | 349/96 |
| 2006/0262401 A1* | 11/2006 | Takahashi et al. | 359/494 |
| 2007/0035682 A1* | 2/2007 | Ito et al. | 349/98 |

FOREIGN PATENT DOCUMENTS

| | | |
|---|---|---|
| DE | 10 2004 063 83 | 7/2006 |
| DE | 10 2005 023 743 | 11/2006 |
| EP | 0 583 114 | 2/1994 |
| EP | 1 563 346 | 8/2005 |
| WO | WO 2004/044659 | 5/2004 |

OTHER PUBLICATIONS

International Search Report, dated Oct. 7, 2008, issued in priority International Application No. PCT/EP2008/057000.

(Continued)

*Primary Examiner* — Jennifer L. Doak
(74) *Attorney, Agent, or Firm* — Saul Ewing LLP

(57) ABSTRACT

In known light modulation means, complex phase and amplitude values for modulating light waves are implemented and modulated either separately by two different light modulation means or a light modulation means having two layers of double-refracting materials, leading to increased expenses for material and adjustment. A new device is disclosed that simplifies the modulation of light waves in phase and amplitude in a single light modulation means made of double-refracting material. In a device having regularly disposed, controllable light-modulated elements having a double-refracting material for complex modulation of coherent light waves, and a modulation controller controlling the force-induced alignment of the optical axes of the molecules of the double-refracting material, means are provided for independently aligning the optical axes of the molecules in the light-modulating elements in two dimensions. The alignment can take place by electrical, magnetic, or optical acting means.

22 Claims, 7 Drawing Sheets

(56) References Cited

OTHER PUBLICATIONS

De Bougrenet de la Tocnaye et al., "Complex amplitude modulation by use of liquid-crystal spatial light modulators," Applied Optics Opt. Soc. America USA, Bd. 36, Nr. 8, pp. 1730-1741 (Mar. 10, 1997) XP007902479.

* cited by examiner

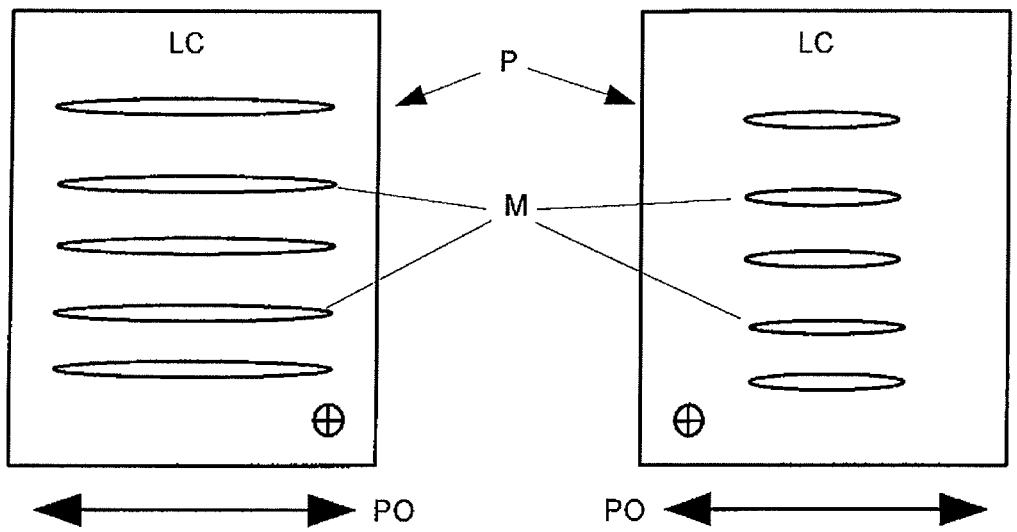
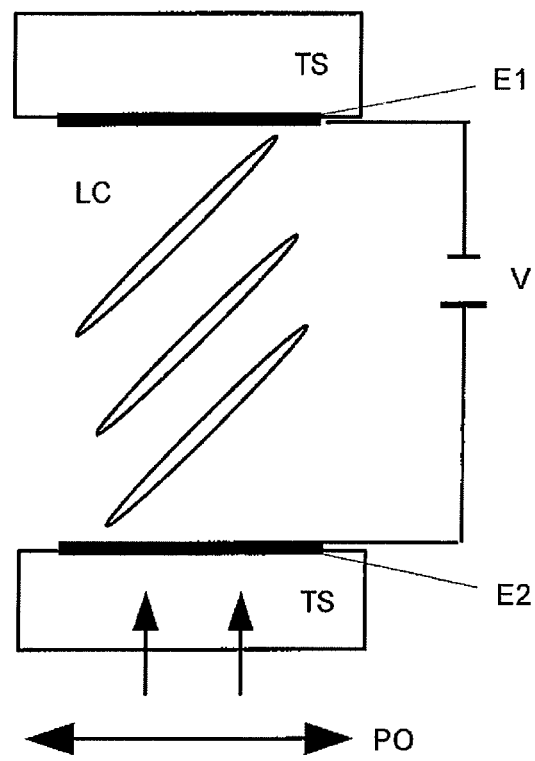
Fig. 1a  Fig. 1b
Fig. 1c

DEVICE FOR LIGHT MODULATION

CROSS REFERENCE TO RELATED APPLICATIONS

This application claims the priority of PCT/EP2008/057000, filed on Jun. 5, 2008, which claims priority to German Application No. 10 2007 028371.9, filed Jun. 13, 2007, the entire contents of which are hereby incorporated in total by reference.

BACKGROUND OF THE INVENTION

The present invention relates to a device for light modulation with regularly arranged controllable light-modulating elements, which comprises a birefringent material whose molecule axes are given a certain orientation as they are affected by controllable forces in order to modulate the phase and amplitude of a sufficiently coherent light wave.

The field of application of this invention are light modulator means, e.g. flat spatial light modulators with high image resolution, which are used as display panels in video and TV devices, projectors and similar devices for holographic representations. In combination with an illumination means and an optical system, these panels can be used as holographic displays for the holographic reconstruction of a scene. The holographic display can be both a direct-view display and a projection-type display. The controllable elements can be the pixels of a light modulator.

The present invention shall be seen in conjunction with a preferably real-time or near real-time holographic representation of a video. In this document, the video comprises a multitude of scenes (frames), each of which being individually encoded in the elements of the light modulator means in the form of a hologram. For encoding a hologram, a number of methods are known which take into consideration the properties of the provided light modulator means.

In the description of this invention, the term 'regularly arranged controllable elements' refers either to the pixels of a light modulator or to a continuously variable, non-pixelated encoding surface of a light modulator, which is formally divided into discrete regions by the information to be displayed.

A particular type of a holographic display is known from earlier documents filed by the applicant, e.g. from (1) EP 1 563 346 A2, (2) DE 10 2004 063 838 A1 or (3) DE 10 2005 023 743 A1.

There, the hologram computation is executed on the following basis: A three-dimensional scene is divided into a multitude of object points for encoding and holographically reconstructing. During the passage of coherent light through the light modulator, the controllable elements modulate the amplitude and/or phase of the light in order to be able to reconstruct each object point of the scene again. Each object point is encoded e.g. in a certain region of the encoding surface of the light modulator means, and said region then reconstructs it. This region is referred to as the sub-hologram of this object point. The sub-hologram corresponds roughly to a holographically encoded lens function which reconstructs this one object point in its focal point. The object point must be encoded in the form of complex values. The absolute value of the complex values, i.e. the amplitude, is about constant across the entire sub-hologram, and its magnitude depends on the axial distance of the object point to the screen and on the luminous intensity of the object point. The phase distribution of the complex values within the sub-hologram corresponds roughly to the function of a lens whose focal length depends on the axial distance of the object point to the light modulator means or the screen. Outside the sub-hologram, the value '0' has to be written to the light modulator means for this object point. Only those pixels of the light modulator which lie within the sub-hologram contribute to the reconstruction of that single object point. The entire hologram is obtained by adding up the individual sub-holograms.

The holographic reconstruction of the scene is for example generated in co-action with an optical reconstruction system in a reconstruction volume which stretches between the visibility region and the light modulator means. Wave fronts which are emitted by the holograms of the scene which are encoded on the light modulator means are superimposed in the visibility region, and the reconstructed object points can be seen there from an eye position. The reconstruction of the superimposed modulated wave fronts cannot be seen simultaneously by both eyes of an observer. Individual perspective views of the three-dimensional scene are generated for each eye of an observer in a time- or space-division multiplex process, where said views differ in parallax, but are perceived by the brain as a single holographic 3D representation.

For watching the reconstruction of the three-dimensional scene, the observer can either look at a light modulator means on which a hologram of the scene is directly encoded, and which serves as a screen. This is referred to as a direct-view arrangement. Alternatively, the observer can look at a screen onto which either an image or a transform of the hologram values which are encoded on the light modulator means is projected. This is referred to as a projection arrangement. The eye positions of observers are detected in a known manner by a position finder, which is linked to a computing unit by software means.

The computation of a hologram of the scene, which can also be a computer-generated hologram, and whose values are available in a memory unit in the form of a look-up table, provides in the computing unit complex numbers or complex values for each object point, which must be encoded on, i.e. written to the light modulator means. The complex values are encoded in the pixels of a spatial light modulator (SLM) in the case of a pixelated SLM, or in discrete regions of the continuous encoding surface, where said regions are formally defined by the information to be displayed, in the case of a non-pixelated SLM.

Incident coherent light waves can be modulated by SLMs which only modulate the phase of the light waves, or by SLMs which only effect an amplitude modulation. Further, there are also SLMs which execute a combined phase and amplitude modulation. Fix combinations of amplitude and phase values can be written to these SLMs, but not arbitrary complex values.

Conventional solutions for representing complex numbers on a SLM for example use multiple adjacent pixels of the SLM for representing one complex number. This always causes disadvantages. For example, encoding the amplitudes in multiple adjacent pixels typically leads to a low diffraction efficiency of the light modulator means. If only phase values are encoded in multiple adjacent pixels, an additional time-consuming iterative computing process is needed in order to approximate the values to be encoded as much as possible to the real scene.

Other known solutions for representing complex numbers, e.g. as disclosed in document U.S. Pat. No. 5,416,618, take advantage of a combination of multiple light modulators, e.g. two phase-modulating light modulators, or a phase-modulating light modulator and an amplitude-modulating light modulator. One of the disadvantages here is that a very difficult and laborious adjustment process is necessary in order to precisely match the pixel grids of the two light modulators.

Document U.S. Pat. No. 5,719,650 describes a light modulator for controlling the amplitude and phase independent of each other. It comprises two polarisation-rotating elements with one liquid crystal layer each, each of said elements being disposed between two carrier substrate plates. Moreover, the basic electrodes and the grid electrodes are provided separately for each layer. An alignment of the two elements is already performed during the manufacturing process. However, no SLM is commercially available today which includes only one liquid crystal layer to which the complex-valued information of a holographic scene can be written directly and modulated with light.

As is commonly known, one way of realising a light modulator is based on the use of liquid crystals (LC). Liquid crystals are birefringent materials, where the optical axis of the molecules can be controlled to have a desired orientation, e.g. by applying an electric field. In a nematic liquid crystal, the optical axis is the longitudinal axis of a molecule. In a light modulator of such type, the modulation of the incident light depends on the set orientation of the optical axes of the molecules relative to the direction of light passage through the light modulator, and on the polarisation of the light. LC-type light modulators are known which can be used either as amplitude-modulating light modulators or as phase-modulating light modulators.

Document EP 0583114 describes an optically addressable SLM (OASLM). In addition to the liquid crystal layer and the electrodes, it comprises a photoconductive layer. The conductivity of the photoconductive layer is varied depending on the intensity of the write light which falls on the SLM. If an electric field is then applied through the electrodes and photoconductive layer, the photoconductive layer will affect the field which is applied to the liquid crystal layer depending on its conductivity which is controlled by the write light. The orientation of the molecules of the liquid crystal layer is effected according to the applied electric field, and it then serves to modulate the sufficiently coherent read light. While in an EASLM an individual control voltage must be addressed to each pixel, in an OASLM a constant control voltage is supplied and the local orientation of the molecules is effected by the write light. A conventional OASLM can nevertheless only be used to modulate either the phase or the amplitude of the read light.

In a single light modulator with a single liquid crystal layer, phase and amplitude can therefore not be modulated independent of each other, because an electric field or similar effective force applied to the LC layer can always only modify one parameter in order to affect the orientation of the axes of the liquid crystal molecules. This will be explained in detail below with reference to FIG. 1 for a phase modulation and FIG. 2 for an amplitude modulation.

The drawings of FIG. 1 show schematically a pixelated phase-modulating light modulator, representing the prior art, whose function will be explained below with the example of a region of the modulator which has the size of one pixel P. Only the major elements will be shown and described.

The pixel P is shown to have a frame and it comprises a birefringent material, for example a liquid crystal layer LC with molecules M onto which almost coherent light falls. The direction of light incidence is perpendicular to the plane of the drawing, as is indicated by a circle with a cross in the Figures.

In the top view in FIG. 1a, the molecules M are shown in an initial situation in the off state of the phase-modulating light modulator. The incident light is vertically polarised, indicated by a double arrow, and the optical axes of the molecules M are oriented parallel to the incident light.

In FIGS. 1b and 1c, the pixel P is shown schematically in the on state of the phase-modulating light modulator at a medium voltage. The optical axes of the molecules M are turned out of the plane by a certain angle caused by the applied voltage V. If a maximum voltage is applied, the axes will be oriented at right angles to the plane. The liquid crystal layer LC is embedded within two opposing carrier substrates TS, e.g. glass plates, as is shown in FIG. 1c. The molecules M are controlled in their optical properties by applying an electric field between opposing electrodes E1 and E2. The direction of light incidence is indicated by arrows. The applied voltage V does not change the polarisation direction of the light, but the phase of the light is affected by the orientation of the optical axes of the molecules M.

Things are similar with an amplitude-modulating light modulator according to the prior art, for example as used in an in-plane switching (IPS) display. Its function is shown in the drawings of FIG. 2, again with the example of a region with the size of one pixel P. Similar to the drawings in FIG. 1, FIGS. 2a and 2b show a top view of a pixel P, while FIG. 2c is a side view.

The orientation of the optical axes of the molecules M and the polarisation PO of the incident light in the off state of the pixel P in FIG. 2a are the same as those in FIG. 1a.

However, the electrodes E1 and E2 are arranged differently in FIG. 2a. The applied voltage V is effective from left to right in this arrangement, while there is no representation of the electric field in the side view. This drawing is schematic and very rough. Since the lateral extent of a pixel is typically larger than few micrometers, the transversal electrode is usually sub-divided in order not to have to apply a voltage that is too large. Consequently, multiple electrodes are connected in series per pixel. However, only 2 electrodes are shown here to maintain a certain clarity of the drawing.

FIGS. 2b and 2c show a pixel P in its on state. If a medium voltage V is applied, the optical axes of the molecules are turned in the plane, as shown in FIG. 2b, which is indicated by the slight inclination of the molecules M. In contrast, in FIG. 2c the molecule axes are not turned in the plane of the top view. The polarisation of the incident light is turned starting from the value PO1 by a certain angle to the value PO2 as the optical axes of the molecules M are oriented when a voltage V is applied at a given thickness of the liquid crystal layer LC. The magnitude of the turning angle of the polarisation is twice the angle between the polarisation PO of the incident light and the resultant orientation of the optical axes of the molecules M.

The amplitude of the light can then be modulated after the passage of the light through the liquid crystal layer LC by a polariser (not shown) which is disposed after this layer. For example, with parallel polarisers a maximum amplitude is obtained without a voltage applied, and an amplitude of zero is obtained with a voltage applied and a turn of the optical axis of the molecules by 45° —and consequently a turn in polarisation by 90°. In summary, it can be noted that using a single light modulator, the incident light waves can always only be modulated with one part of the complex value.

If a combination of two SLMs of a liquid-crystal-type are to be realised by a fix attachment of the two already during the manufacturing stage for simultaneous modulation of amplitude and phase, certain criteria must be observed. Since the two SLM in addition to the LC layer also require carrier substrates, which can be glass plates or flexible layers, there is a relatively large distance between the two LC layers. To achieve a correct complex-valued modulation, the two SLMs have to be disposed such that the pixels are fully congruent, so that the light always passes two accordingly assigned pixels. Because of the distance between the two LC layers, which cannot be completely avoided, this condition is no longer fulfilled already for small angles of incident light beams, not to mention when light is transmitted through the SLM panels at oblique angles. But even in the case of a perpendicular incidence of the light, an imprecise adjustment of the light source which is assigned to the two pixels may cause the light to pass two different pixels in the two SLM panels.

This disadvantage particularly applies to small lateral pixel sizes of few micrometers, which are, however, particularly preferred in the context of holographic reconstructions. This is why a correct reconstruction of a holographic scene is difficult to achieve with a combination of two SLMs.

SUMMARY OF THE INVENTION

It is the object of the present invention to circumvent the above-mentioned disadvantages of the prior art when representing complex hologram values, and to simplify the modulation of amplitude and phase of light waves using a single light modulator device.

The present invention is based on a device with regularly arranged controllable light-modulating elements, which comprises for modulating the phase and amplitude of a sufficiently coherent light wave a birefringent material in molecular form, where a modulation controller controls an orientation of the optical axes of the molecules, which is affected by the application of a force.

The object is solved according to this invention by controllable means which vary the orientation of the optical axes of the molecules in the light-modulating elements in two dimensions independent of each other, and by a polariser which is disposed on the light exit side. In a preferred embodiment, the birefringent material comprises a single layer of liquid crystals.

According to one feature of this invention, the orientation of the optical axes of the molecules can be affected by two controllable external effective means. They can be controlled gradually such that they affect the optical axes of the molecules such to set two angles of the projection of the optical axes of the birefringent material in two perpendicular planes independent of each other.

Thanks to the mutually independent orientation of the optical axes in two dimensions, complex values can preferably be represented by various combinations of amplitudes and phases. In contrast to the prior art, values for the modulation of an amplitude and those for the modulation of a phase of a light wave are neither fixedly combined nor mutually dependent any longer in a light modulator which is designed according to this invention.

In a first embodiment of the means, at least one of the external effective means is an electric field.

In a second embodiment of the means, at least one of the external effective means is a magnetic field.

In a third embodiment of the means, at least one axis of the molecules is oriented with the help of optical means.

A further characterising feature of the invention is that two means which generate an electric or magnetic field are disposed about at right angles to each other at each light-modulating element of the light modulator.

Two embodiments are proposed for affecting the orientation with the help of optical means.

In the first embodiment, the layer of the liquid crystal or other birefringent material is doped with dye molecules, and the orientation in one plane is affected by varying the polarisation of write light which falls on the device. The orientation in the other plane is affected by generating an electric or magnetic field.

In the second embodiment, the optical axes of the molecules are oriented in one plane by varying the intensity of incident write light. To this end, the device additionally comprises a layer of a photoconductive material, which reacts on the write light. The orientation in the other plane is again affected by generating an electric or magnetic field.

However, any other combinations of these embodiments are thinkable as well.

In another embodiment of the present invention, the device is a spatial light modulator means with light-modulating elements. If a hologram of a scene is written to these elements, and if the device additionally comprises an illumination unit and an optical system, then it can be used for representing holographic scenes. Devices of such arrangement can be used as light modulators in a holographic display.

A further characterising feature of the present invention is that the light-modulating elements are pixels, and that pairs of the orientation-affecting means are assigned to the pixels so to affect an orientation in two planes, in order to simultaneously modulate both the phase and amplitude of the incident light in each individual pixel.

The object is further solved by a method for light modulation using a device which comprises a birefringent material in molecular form, with a regular arrangement of controllable light-modulating elements for the modulation of amplitude and phase of sufficiently coherent light waves, where the orientation of the optical axes of the molecules is affected by the application of forces, which is controlled by a modulation controller. According to the present invention, the method is characterised in that the optical axes of the molecules are oriented in two dimensions independent of each other by controllable means which affect the light-modulating elements from outside, and in that a polariser is provided which is disposed on the exit side.

The orientation of the axes of the molecules is affected in process steps by two external effective means which can be controlled independent of each other. The orientation of the axes is preferably controlled continuously.

In an embodiment of the method, a hologram of a scene is written to the device which is designed in the form of a spatial light modulator means. If an illumination unit illuminates the hologram, then a holographic reconstruction of the scene can be generated in conjunction with an optical system, and the components together realise a holographic display means.

In another embodiment of the method, two electric fields which are generated by electric means and which have perpendicular effective directions and whose strength can be controlled independent of each other affect the optical axes of the molecules in order to simultaneously modulate the phase and amplitude of the incident light.

In a modification of the above-described method, it is also possible that two magnetic fields which have perpendicular effective directions and whose strength can be controlled independent of each other affect the optical axes of the molecules and to vary their orientation. It is further possible that a combination of an electric field and a magnetic field with a perpendicular effective direction are used for orienting the optical axes of the molecules. Moreover, other combinations of the means for orienting the optical axes of the molecules mentioned in the device claims can be used in this method.

The orientation of the optical axes of the molecules in the plane of the light modulator means can also be affected optically, e.g. by way of photo-alignment with the help of polarised write light in the birefringent material which is doped with dye molecules, and by the effect of an electric field or magnetic field in a plane which is perpendicular to the former. If the device already comprises an illumination means with at least one linear polarised light source, then the polarisation of that light source already fulfils the function of a polariser which otherwise had to be disposed on the face of light incidence. In this case, the polarisation of the write light can be varied without the occurrence of any disturbing effects caused by the polariser.

A further possibility of using polarised write light is a light modulator which is reflective for the wavelength of the read light, which can be written from its rear side.

Using the method described here and the means for light modulation describe here, a holographic display device can be realised for generating a holographic reconstruction. The holographic display device comprises a light modulator device with a light modulator means with regularly arranged pixels and a liquid crystal layer, where in order to modulate the phase and amplitude of sufficiently coherent light waves which are emitted by an illumination unit the orientation of the optical axes of the LC molecules is affected in two dimensions independent of each other by controllable means which act on the pixels from outside, controlled by a modulation controller, according to the embodiments described above, in order to simultaneously modulate resultant phase and amplitude values of a holographically encoded 3D scene, where the holographic display device further comprises an optical system for reconstructing the 3D scene in a reconstruction volume with the help of the light waves which are modulated in the light modulator means.

Thanks to the device according to this invention, encoding the computed complex hologram values of a 3D scene and modulating incident coherent light waves with phase and amplitude values can be simplified, because only one single SLM with one single liquid crystal layer is required. In contrast, a combination of multiple SLMs or one SLM with multiple independent liquid crystal layers are used in prior art devices and methods. A further advantage is that, in comparison with solutions which involve multiple SLMs, disturbing effects between the individual LC and substrate layers during the propagation of the light are circumvented.

BRIEF DESCRIPTION OF THE DRAWINGS

Now, the device for light modulation according to the present invention and a corresponding method will be described in more detail with the help of accompanying Figures, wherein FIG. 1a is a top view showing a pixel of a SLM for phase modulation with molecules of a liquid crystal layer in the off state, representing the prior art, FIG. 1b is a top view showing a pixel of a SLM for phase modulation with molecules of a liquid crystal layer in the on state, representing the prior art, FIG. 1c is a side view of the situation in FIG. 1b.

DETAILED DESCRIPTION

Figure 2A:
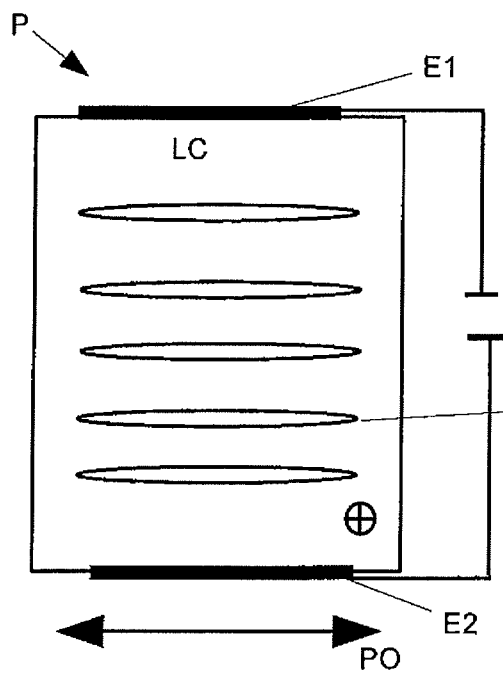
FIG. 2a is a top view showing a pixel of a SLM for amplitude modulation with molecules of a liquid crystal layer in the off state, representing the prior art.

The device will be described in the physical form of a light modulator means. Light modulator means have a pixelated encoding surface and are either of a transmission type or of a reflection type; they comprise a regular arrangement of pixels with finite extent, which are separated by gaps owing to the manufacturing process. In the case of a liquid crystal modulator, the encoding surface is for example crisscrossed by a grid of fine electrodes between which there are pixels which are characterised by a certain distance to each other, the pixel pitch. The electrodes are switched by a control unit, in particular with the help of a computer by software means, such that the amplitude and phase of the pixels are encoded with respect to a transmittance or reflectance. The transmissive pixels which are encoded with complex values transmit the incident light waves, while the reflective pixels reflect the light waves. To maintain a certain clarity of the drawing, the representation of optical, light-related and other electrical or electronic means is omitted.

Now, the invention is based on the following idea: A birefringent material is suited for representing complex values for the modulation of incident light waves because it comprises molecules with two optical axes, which are effective in two different planes. It must be achieved to affect the orientation of the optical axes of the molecules in two dimensions independent of each other in order to be able to control phase and amplitude of the light waves independent of each other. This happens as follows: If a section plane is laid in the birefringent material, and if a coordinate axis is laid in this section plane, then the geometric projection of the optical axis into this section plane draws an angle to the coordinate axis. This angle can be varied by moving the optical axis of the molecules in this plane. If a second section plane is laid at a right angle to the first one, and if a second coordinate axis is laid in this second section plane at a right angle to the first coordinate axis, then the geometric projection of the optical axis also draws an angle to this coordinate axis. A modification of these two angles independent of each other corresponds to an orientation of the optical axes of the molecules in two dimensions independent of each other according to this invention.

The orientation of the optical axes is generally combined with the polarisation of the incident light. In order to obtain a turn of the optical axes of the molecules in two dimensions in a pixel of for example a light modulator with a birefringent material, a polariser is disposed before the light modulator. If linear polarised light sources are used for illumination, the polarisation of the light emitted by that light source itself replaces the additional polariser.

First, if the orientation of the optical axes of the molecules is considered in one plane only in a top view, then one can imagine the linear polarised incident light being divided into a component which is parallel to the optical axes of the molecules, and one component which is perpendicular to it. When light is transmitted through the birefringent material, e.g. through a liquid crystal (LC) layer, then there will be a retardation between these two components because of the different refractive indices of the LC layer parallel and perpendicular to its optical axis.

On the one hand, this retardation depends on the thickness of the layer through which the light is transmitted. On the other hand, it can also be affected by a turn of the LC molecules out of this plane. The component of the light which was initially oriented perpendicular to the optical axis will remain at right angles, but the other component, which was initially oriented parallel to the optical axis, will change its angle to the optical axis of the molecules due to this turn of the molecules. This causes a different effective refractive index for the light. The retardation between the two components is thus reduced while the thickness of the LC layer remains the same.

As a result, elliptically polarised light can be generated after passage of the LC layer in the general case. A polariser which is disposed after the LC layer only transmits a portion of it, which is then linear polarised. This portion has a defined amplitude A and a defined phase lag $\delta$. An optical retardation of one wavelength $\lambda$ generally corresponds with a phase lag $\delta$ of $2\pi$. It depends on the birefringence $\Delta n$ and the layer thickness d of the LC layer, according to the equation $$\delta = 2\pi/\lambda \Delta n d,$$

where $\Delta n$ in turn depends on the turning angle $\psi$ of the optical axes of the molecules perpendicular to the plane, according to the equation $$\Delta n = n_= - \frac{n_= \cdot n_\perp}{\sqrt{n^2_\perp \cos^2\psi + n^2_= \sin^2\psi}},$$

where $n_=$ is the refractive index parallel to the optical axis of the molecules, and n1 is the refractive index perpendicular to it. These parameters characterise the actually used birefringent material and are thus material-specific.

The letter $\delta$ denotes the phase lag of the light which results from the thickness of the LC layer and the angle $\psi$ by which the optical axes of the molecules is turned out of the plane, and $\theta$ denotes the turning angle of the molecules relative to the direction of polarisation of the light before it enters the LC layer. Then, in the case that both polarisers are disposed parallel, after passage through the LC layer and through the second polariser,
an amplitude is $$A = \sqrt{1 + 0.5 \sin^2\theta \cdot (\cos\delta - 1)}$$

and a phase is $$\varphi = a\tan\frac{\cos^2\theta \cdot \sin\delta}{\cos^2\theta \cdot \cos\delta + \sin^2\theta}.$$

If the thickness of the LC layer is chosen such that if the optical axes are turned out of the plane there is a resultant phase lag of at least $2\pi$, as in an ordinary phase-modulating light modulator, where the amplitude cannot be varied, then different combinations of amplitude values A and phase values $\varphi$ can be realised by additionally turning the LC molecules within the plane, i.e. by varying the angle $\theta$.

In these two equations, the special case $\theta=0$ and a variation of $\delta$ would correspond with a mere phase modulation at a constant amplitude. The special case $\delta=\pi$ and a variation of $\theta$ would correspond with a mere amplitude modulation. The variation of both parameters, $\theta$ and $\delta$, then causes a complex-valued modulation of the light.

Generally, other arrangements of polarisers are possible as well. The equations for amplitude and phase must then be derived accordingly.

Various external effective means, which will be explained in more detail with the help of the embodiments described below, can be used in a device for light modulation in order to affect the orientation of the optical axes of the molecules for the modulation of light as described above.

FIGS. 3 to 5 are schematic drawings which only show the major components of the device according to this invention. A modulation control is preferably performed discretely for each pixel in a transmission-type light modulator means with a liquid crystal layer LC, where at least two electrodes E1 and E2 are effective per pixel P for the functional control of the molecules M. The orientation of the optical axes of the molecules M of the liquid crystal layer LC is also affected discretely for each pixel. If this should not apply, this will be indicated.

In a first embodiment of the present invention, means for generating electric fields are used for affecting the orientation of the optical axes of the molecules of each individual pixel.

Figure 2C:
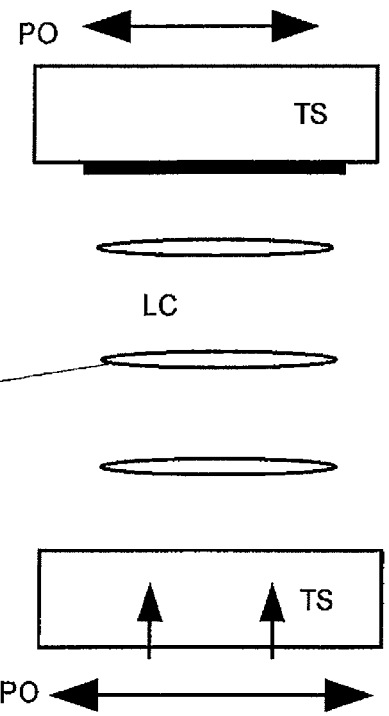
FIG. 2c is a side view of the situation in FIG. 2b.
Figure 2B:
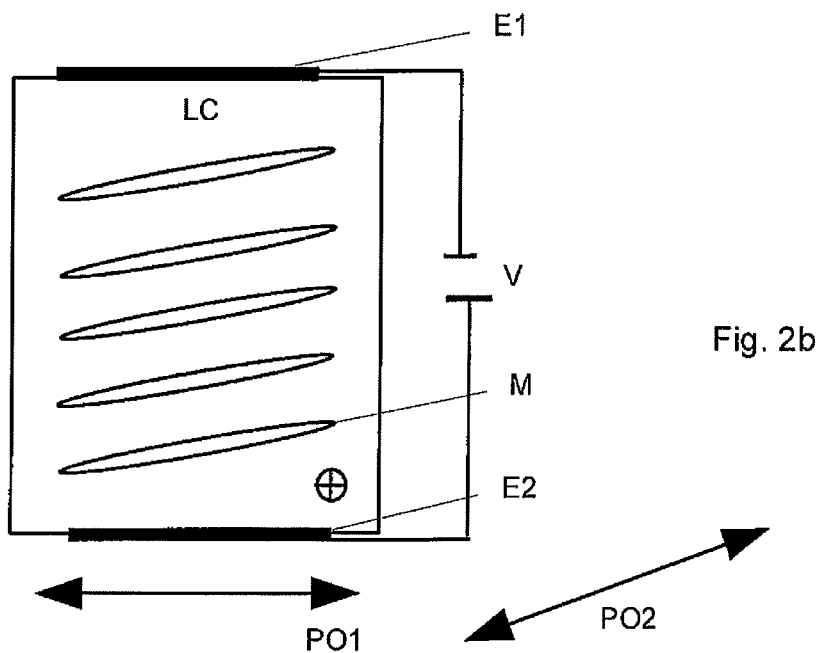
FIG. 2b is a top view showing a pixel of a SLM for amplitude modulation with molecules of a liquid crystal layer in the on state, representing the prior art.
Figure 3A:
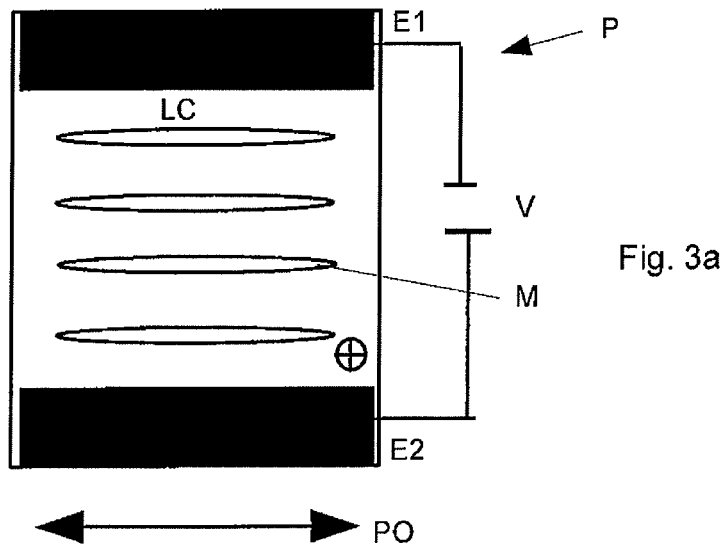
FIG. 3a is a top view showing a pixel of a SLM with molecules of a liquid crystal layer in the off state, representing the present invention.
Figure 3B:
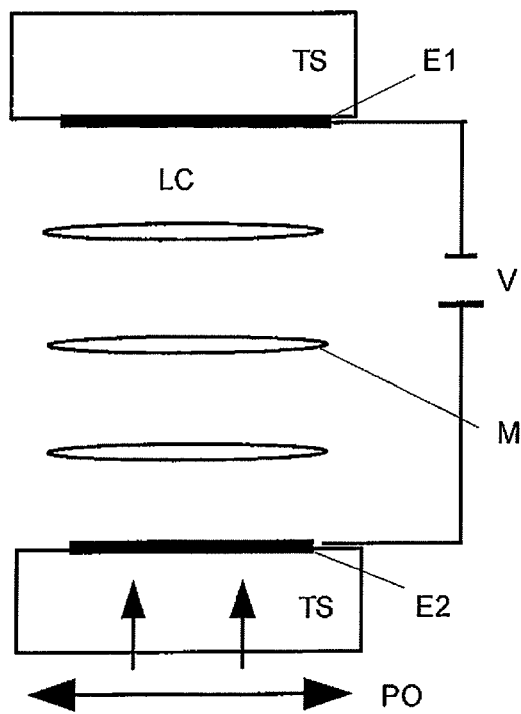
FIG. 3b is a first side view of the situation in FIG. 3a, FIG. 3c is a second side view of the situation in FIG. 3b, turned by 90°.
Figure 3C:
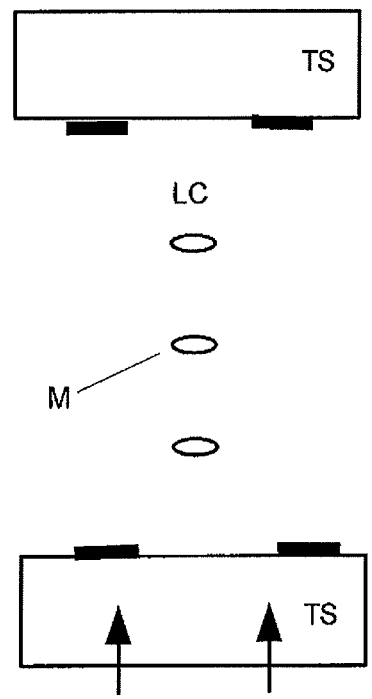
FIG. 3d is a top view showing a pixel of a SLM with molecules of a liquid crystal layer in the on state.
FIG. 3e is a first side view of the situation in FIG. 3d.
FIG. 3f is a second side view of the situation in FIG. 3e, turned by 90°.

FIG. 3a shows a detail of a transmission-type light modulator in the form of a pixel P in the off state. The top view shows molecules M of the liquid crystal layer LC in a plane between two electrodes E1 and E2 with perpendicular effective directions for the functional control of the molecules M. Further, a vertical polarisation PO of the incident light in the pixel P is indicated in the drawing by a double arrow. The orientation of the optical axes of the molecules M, the vertical polarisation PO, and the direction of incidence of coherent light are the same as those in the types of light modulators which are described in the prior art section above. To be able to compare the orientation of the molecules M in two different planes, FIGS. 3b and 3c show a first and a second side view of the molecules M in the pixel P in the off state. The arrows indicate the direction of light incidence. In contrast to the drawings in FIGS. 1 and 2, which represent the prior art, and which only show one side view, a second side view from a perspective which is turned by 90° is shown here for clarification.

Figure 3D:
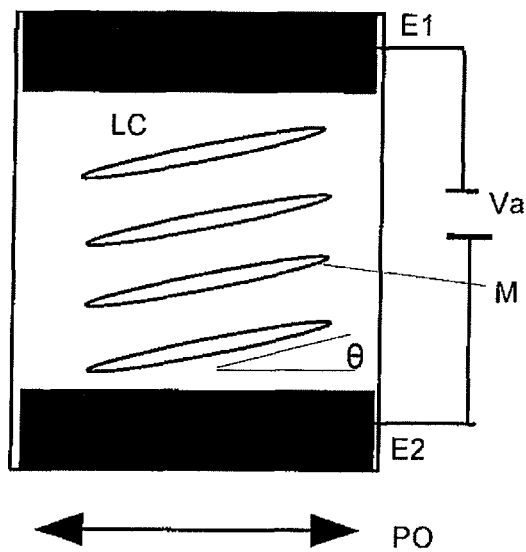
Figure 3E:
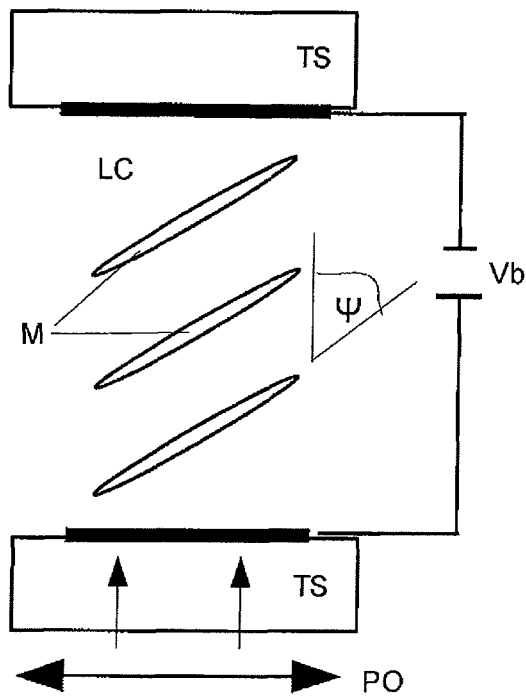
Figure 3F:
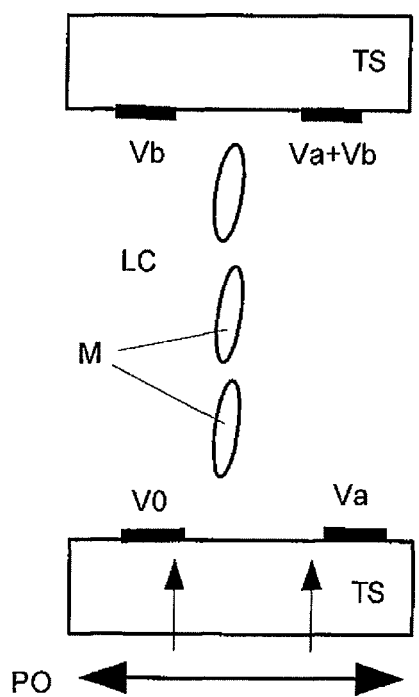

The drawings in FIGS. 3d to 3f show the pixel P according to the first embodiment in the on state. The two opposing electrodes E1 and E2, which can be addressed independently of each other by a modulation controller, generate two electric fields in order to affect the orientation of the molecules. The applied voltage causes the orientation of the optical axes of the molecules M in the pixel P to be affected, or more precisely to be turned by the angle $\theta$ (see FIG. 3d) in the one plane and by the angle $\psi$ in the other plane. These turning angles $\theta$ and $\psi$ affect both the amplitude and phase of incident light waves, as can be seen in the equations given above.

The first side view in FIG. 3e illustrates the turning angle $\psi$ of the optical axes of the molecules in the other plane which is caused by the applied voltage.

FIG. 3f is a second side view, which illustrates the situation of FIG. 3e turned by 90°; it shows the pixel P with four voltage values V0, Va, Vb, and Va+Vb. The bottom left electrode is given the voltage value V0 and the top left electrode is given the voltage value Vb. Hence, the voltage Va−V0 is applied between the left- and right-hand side, and the voltage Vb−V0 is applied between the top and bottom end. The top right electrode then has the voltage value Va+Vb.

This arrangement allows the orientation of the optical axes of the molecules of the pixel P to be affected in the two dimensions—top view and side view—independent of each other by varying the voltage values Va and Vb. The amplitude and phase of the transmitted light are modulated according to the orientation of the optical axes. Since the voltage values can be controlled independent of each other, various combinations of amplitude and phase values can be realised. Similar to FIG. 2, this drawing is schematic and very rough. The electrode which covers one pixel in FIGS. 3a and 3d can also be replaced by multiple single electrodes which are connected in series, in order to allows for the different lateral extent and thickness of a pixel.

In a second embodiment of the means, which will not be described in more detail here, magnetic fields which act on a pixel in perpendicular effective directions can be generated instead of two electric fields generated by different voltages. The means for this can be disposed in analogy with the arrangement for generating the electric fields for affecting the orientation of the optical axes of the molecules in two planes independent of each other. It is further possible to combine an electric field and a magnetic field with perpendicular effective directions on a pixel or in a light modulator.

In further embodiments, optical means and/or methods can be used for affecting the orientation of the optical axes of molecules.

In a first embodiment of the optical means, advantage is taken of the photo-alignment principle, where the orientation of the molecules in the display plane is affected optically in a light modulator with birefringent material. This means that e.g. a liquid crystal layer is doped with dye molecules and that the orientation of the optical axes of the molecules is affected by the polarisation of incident write light. Such light modulators are known as so-called dye-doped optically addressable spatial light modulators (dye-doped OASLM). The write light which is emitted by a light source and which falls on the light modulator can be incoherent light. The orientation of the optical axes of the molecules in the plane which is perpendicular to the display plane is affected by an electric field with the help of conventional electrodes. Such light modulators are known as EASLM.

Figure 4A:
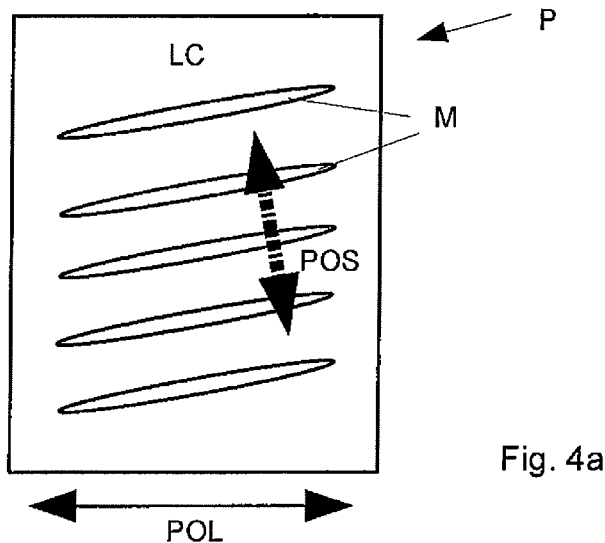
FIG. 4a is a top view showing a pixel of a SLM with molecules of a liquid crystal layer with optical orientation of the molecules.

FIG. 4a is a top view that shows an example of a combination of an OASLM and an EASLM, again as a detail with the extent of one pixel P. The molecules M in the liquid crystal layer LC are shown with a slight turn out of the one plane. They are oriented at right angles to the direction of polarisation of the write light POS. The term 'write light' is used here to denote incident light for affecting the orientation of the molecules M in the liquid crystal layer LC. In contrast, 'read light' is the light which is modulated by the light modulator. In this example, it has a vertical polarisation POL, as indicated by a double arrow outside the pixel P; its further properties and its wavelength can also differ from the write light. A polariser in the plane of incidence of the light modulator is not necessary.

Figure 4B:
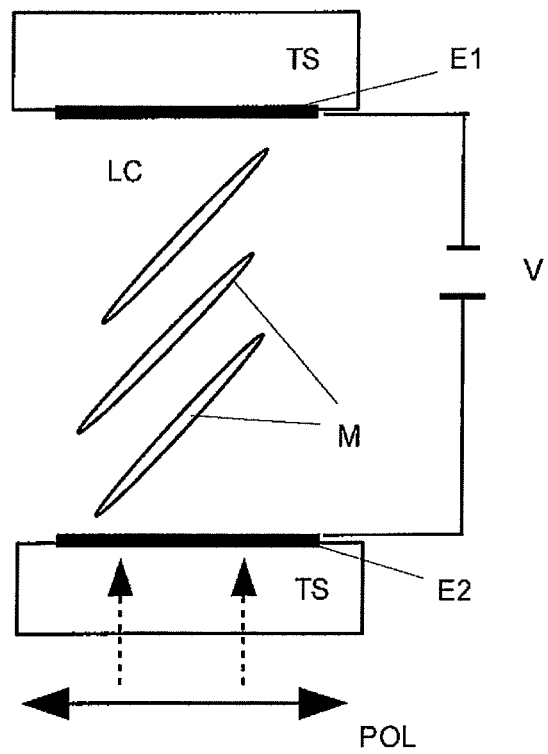
FIG. 4b is a side view of the situation in FIG. 4a, FIG. 5a is a side view of a pixel with optical orientation of the molecules during the writing process.

FIG. 4b is a side view showing the orientation of the molecules M in the other plane, i.e. perpendicular to the plane in the drawing in FIG. 4a, which is here affected with the help of an electric field. In contrast to the plane shown in FIG. 4a, the molecules are here turned further out of the plane by the modulation controller in accordance with the complex value to be represented in this example. The structure of the electrodes, the electric addressing of the light modulator and the arrangement of the carrier substrates TS, shown with the example of one pixel P in this drawing, are the same as in a conventional liquid crystal modulator. The direction of incidence of the read light is indicated by arrows with dotted line. To summarise, the combination of optical and electric addressing also allows the orientation of the optical axes of the molecules to be affected in two dimensions independent of each other.

In other types of OASLM, an electric field is generated by optical addressing and the write light. The other, perpendicularly arranged electric field can independently affect the orientation of the molecules in the OASLM for example with the help of a TFT and electric addressing. This will be described in detail below.

Figure 5A:
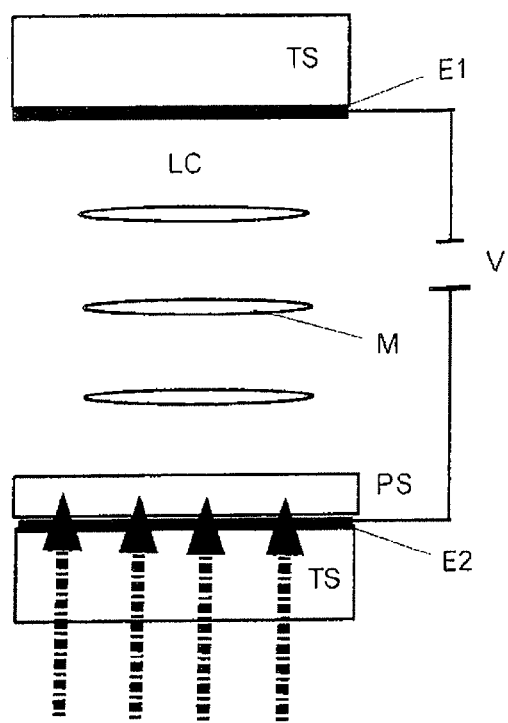
FIG. 5b is a first side view, which illustrates the reading process for the optical orientation.
FIG. 5c is a second side view of the situation in FIG. 5b, turned by 90°.

In a second embodiment of the optical means, a light modulator comprises in addition to the liquid crystal layer a photoconductive layer. FIG. 5a shows in a side view a detail of a light modulator with the extent of a pixel P with molecules M in the liquid crystal layer LC, the electrodes E1 and E2, the carrier substrates TS, and the photoconductive layer PS. The molecules are shown in their initial position. This Figure shows the writing process in the pixel P, and the arrows with the broken lines indicate the direction in which the write light falls on the photoconductive layer PS. The conductivity of the photoconductive layer PS varies depending on the controllable intensity of the write light.

A constant external voltage $V_{fest}$ is applied for the reading process with read light. A effective voltage $V_{eff}$ is generated across the LC layer depending on the conductivity of the photoconductive layer PS as controlled by the write light. The optical axes of the molecules M are oriented in this plane in accordance with this effective voltage. This is shown in a first side view in FIG. 5b. This works as in an ordinary OASLM. The polarisation PO of the read light is again indicated by the double arrow.

In the plane which is perpendicular to the former, an electric control is performed as in an IPS-SLM. An 'in-plane' voltage value is addressed in this plane for each pixel P of the light modulator. To this end, an electric field is generated in the pixel P.

Figure 5B:
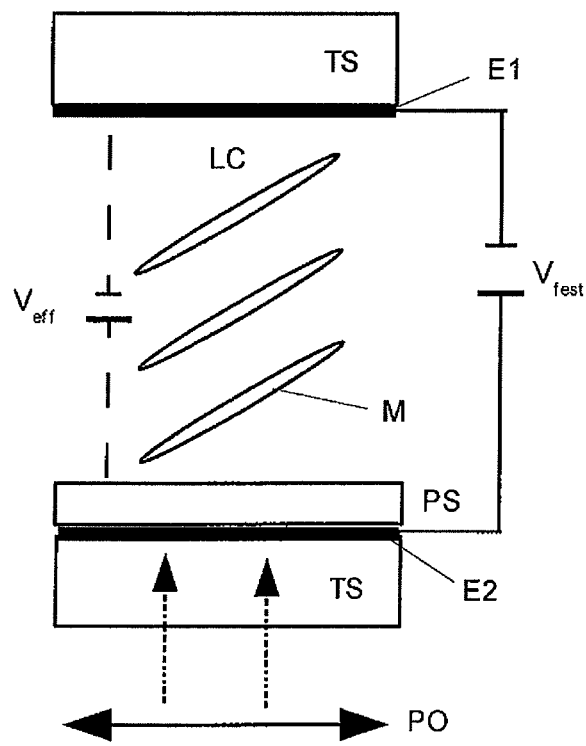
Figure 5C:
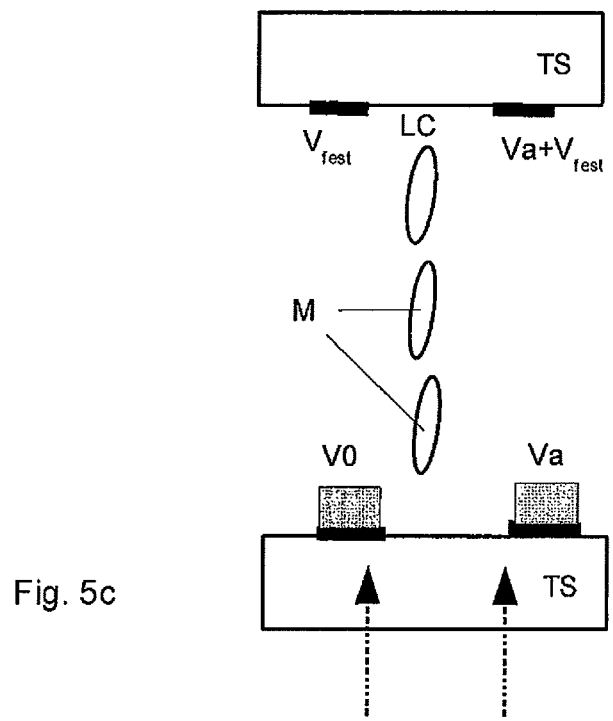

FIG. 5c shows a second side view, which represents the same situation as in FIG. 5b but turned by 90°, and which thus illustrates the addressing from another perspective. The bottom electrodes with the voltage values V0 and Va and the top electrodes with the voltage values $V_{fest}$ and Va+$V_{fest}$ cause a fix external voltage difference to be applied to the pixel P from bottom to top, where the effective voltage across the LC layer is individually controlled optically by the write light. From left to right, however, an individual voltage is addressed electrically on each pixel P of a light modulator. This combination allows the orientation of the optical axes of the molecules M to be affected in the two planes independent of each other.

In contrast to a mere electric control, where two independent voltage values must be addressed to each pixel in the horizontal and vertical direction, the combination of an electric and an optical control of the pixels of a light modulator for independent orientation of the molecules has the advantage of requiring less intricate display electronics.

Figure 6:
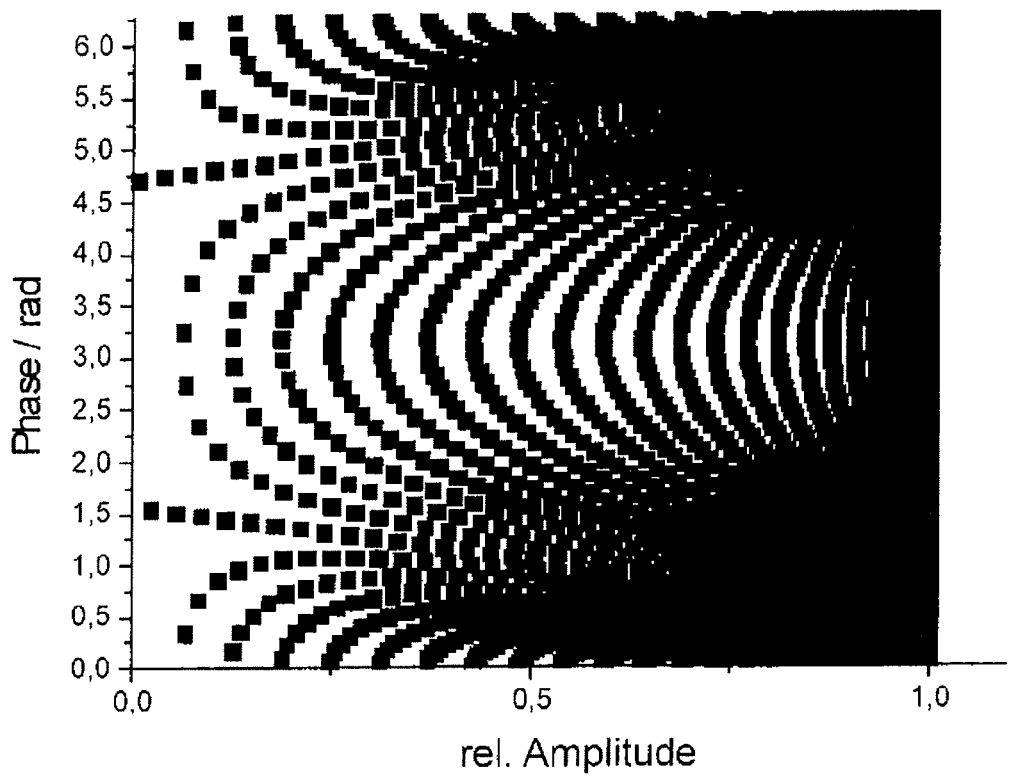
FIG. 6 is a graphic representation of amplitude and phase combinations which represent complex-valued modulations.

FIG. 6 is a graphic representation of combined amplitude and phase values which represent complex-valued modulations of light waves which fall on a light modulator. The horizontal axis shows relative amplitudes between 0 and 1, the vertical axis shows phases between 0 and $2\pi$. The individual dots represent examples of different complex numbers with a respective amplitude and phase, which can be realised by corresponding combinations of the parameters θ and δ.

The present invention can be used in both pixelated and non-pixelated light modulators. If at least one of the means generates an electric field for affecting the orientation of the optical axes of the molecules, the light modulator must be of a pixelated type, i.e. also if a combination of electric and optical control is used.

If the orientation of both optical axes of the molecules is affected with optical means, a non-pixelated light modulator onto which a pixel structure is formally created from outside by the information which is actually to be displayed can be used as well. For example, an arrangement with two write light beams can be used, where one write light beam affects the orientation of the molecules in the one plane by varying the intensity of the write light, and the other write light beam affects the orientation of the molecules in the other plane by the polarisation.

A hologram of a three-dimensional scene is encoded in a holographic display device with a light modulator which comprises a liquid crystal layer and which is designed in accordance with one of the embodiments described above. An illumination unit with a light source which emits almost coherent light illuminates the light modulator. A modulation controller controls the modulation of amplitude and phase of the incident light in two different planes independent of each other by way of accordingly affecting the orientation of the molecules of the liquid crystal layer. The scene is then reconstructed in a reconstruction volume by the modulated light waves together with an optical system.

A device for light modulation in accordance with this invention makes it possible to realise the modulation of complex values representing the most various combinations of amplitudes and phases in a single light modulator. Their usage in a holographic display for representing holographic scenes preferably reduces the cost of materials, since only one light modulator is required, and the computational load.

The invention claimed is:

1. A device, comprising:
regularly arranged controllable light-modulating elements which include a birefringent material in molecular form with a controllable orientation of the molecules and therefore a controllable orientation of their optical axes for the modulation of phase and amplitude, independent from each other, of sufficiently coherent light waves;
a polarizer disposed at the exit side of the light modulating elements; and
a modulation controller controlling the orientation of the optical axes of the molecules of the birefringent material within the light-modulating elements by the application of a force, wherein the modulation controller comprises means to apply the force such to control the orientation of the optical axes of the molecules in the light-modulating elements in two dimensions independently of each other, where the two dimensions are defined by a first coordinate axis laid in a first section plane of the birefringent material and a second coordinate axis perpendicular to the first coordinate axis laid in a second section plane perpendicular to the first section plane of the birefringent material.

2. Device according to claim 1, wherein the birefringent material comprises a layer of liquid crystals.

3. Device according to claim 2, which is a spatial light modulator means with light-modulating elements in which a hologram of a scene is written.

4. Device according to claim 3, which additionally comprises an illumination unit and an optical system for reconstructing the holographic scene.

5. Device according to claim 3, wherein the light-modulating elements are pixels and the means for affecting the orientation are respectively assigned to these pixels.

6. Device according to claim 1, wherein the orientation is affected in two dimensions by two controllable external effective means.

7. Device according to claim 6, wherein at least one external effective means is an electric field or is a magnetic field or where two external effective means which are of the same type and which are disposed perpendicular to each other are provided on each light-modulating element.

8. Device according to claim 1, wherein the orientation of the optical axes of the molecules is affected by optical means in at least one plane.

9. Device according to claim 8, wherein the birefringent material is doped with dye molecules.

10. Device according to claim 9, wherein the orientation is affected by varying the polarisation of incident write light by an entry-side polariser or a linear polarised light source in one plane, and by an electric field in the other plane.

11. Device according to claim 8, which additionally comprises a photoconductive material and where the orientation of the optical axes of the molecules of the birefringent layer is affected by varying the intensity of write light which falls on the photoconductive layer.

12. A method for light modulation, using a device which comprises a regular arrangement of controllable light-modulating elements for the independent modulation of the amplitude and phase of sufficiently coherent light waves, the light-modulating elements comprising a birefringent material in molecular form with a controllable orientation of the molecules and therefore a controllable orientation of their optical axes and a polarizer which is disposed at the exit side of the light modulating elements wherein a force, controlled by a modulation controller, is applied to affect the orientation of the optical axes of the molecules such that means of the modulation controller control the orientation of the optical axes of the molecules within the light-modulating elements in two dimensions independently of each other, where the two dimensions are defined by a first coordinate axis laid in a first section plane of the birefringent materials and a second coordinate axis perpendicular to the first coordinate axis laid in a second section plane perpendicular to the first section plane of the birefringent material.

13. Method for light modulation according to claim 12, wherein the orientation of the optical axes of the molecules is affected by independently controllable external effective means.

14. Method for light modulation according to claim 13, wherein two electric fields which have perpendicular effective directions and whose strengths are controlled independent of each other act on the molecule axes of each light-modulating element or where two magnetic fields which have perpendicular effective directions and whose strengths are controlled independent of each other act on the molecule axes of each light-modulating element.

15. Method for light modulation according to claim 12, wherein the orientation of the molecules is affected by optical means in at least one plane.

16. Method for light modulation according to claim 13, wherein the orientation of the molecules is affected by any combination of magnetic, electric and optical means in two dimensions independent of each other.

17. Method for light modulation according to claim 13, wherein the device is a spatial light modulator means of a holographic display device and where a hologram of a scene is written to the light-modulating elements of the light modulator means and where an illumination unit illuminates the hologram and generates together with an optical system a holographic reconstruction of the scene.

18. Method for light modulation according to claim 17, wherein the orientation of the molecules axes is affected by way of photo-alignment in the birefringent material which is doped with dye molecules in the plane of the light modulator means, and by the effect of an electric field in a plane which is perpendicular to the former.

19. Method for light modulation according to claim 17, wherein a polariser which is disposed on the light entry face or on the light exit face of the light modulator means polarises the light waves.

20. Method for light modulation according to claim 19, wherein the illumination unit comprises at least one linear polarised light source whose polarisation replaces the function of the polariser which is disposed on the light entry face.

21. Method for light modulation according to claim 12, wherein the orientation of the optical axes of the molecules is controlled continuously.

22. A holographic display device, comprising
an illumination unit,
a light modulator means with regularly arranged pixels and a liquid crystal layer containing liquid crystal molecules,
a modulation controller, and
an optical system for reconstructing the 3D scene in a reconstruction volume with the help of light waves which are modulated in the light modulator means,
wherein in order to modulate, independently from each other, the phase and amplitude of sufficiently coherent light waves which are emitted by the illumination unit, the orientation of the liquid crystal molecules and therefore of the optical axes of the liquid crystal molecules is controllable in two dimensions independently of each other by controllable means of the modulation controller which act on the pixels from outside so to simultaneously modulate phase and amplitude values of a holographically encoded 3D scene, where the two dimensions are defined by a first coordinate axis laid in a first section plane of the birefringent material and a second coordinate axis perpendicular to the first coordinate axis laid in a second plane perpendicular to the first section plane of the birefringent material.

* * * * *